(12) United States Patent
Yoon

(10) Patent No.: US 11,611,488 B2
(45) Date of Patent: Mar. 21, 2023

(54) AI MACHINE LEARNING TECHNOLOGY BASED FAULT MANAGEMENT SYSTEM FOR NETWORK EQUPMENT THAT SUPPORTS SDN OPEN FLOW PROTOCOL

(71) Applicant: SBIT CO., LTD., Uiwang-si (KR)

(72) Inventor: Dong Kwon Yoon, Gyeonggi-do (KR)

(73) Assignee: SBIT CO., LTD., Uiwang-si (KR)

( * ) Notice: Subject to any disclaimer, the term of this patent is extended or adjusted under 35 U.S.C. 154(b) by 13 days.

(21) Appl. No.: 17/117,315

(22) Filed: Dec. 10, 2020

(65) Prior Publication Data

US 2022/0173980 A1 Jun. 2, 2022

(30) Foreign Application Priority Data

Nov. 30, 2020 (KR) .......................... 10-2020-0163694

(51) Int. Cl.
*H04L 45/036* (2022.01)
*H04L 41/16* (2022.01)
(Continued)

(52) U.S. Cl.
CPC .............. *H04L 41/16* (2013.01); *G06N 20/00* (2019.01); *H04L 41/0213* (2013.01); *H04L 41/0654* (2013.01); *H04L 49/25* (2013.01)

(58) Field of Classification Search
CPC ............ G06N 3/02; G06N 3/08; G06N 3/086; G06N 3/088; G06N 20/00; G06N 20/10;
(Continued)

(56) References Cited

U.S. PATENT DOCUMENTS

| 10,027,530 | B2 * | 7/2018 | Mahkonen | ............... H04L 43/04 |
| 11,206,205 | B1 * | 12/2021 | Gupta | ..................... H04L 43/08 |
| 2017/0085488 | A1 * | 3/2017 | Bhattacharya | ...... H04L 41/0813 |

FOREIGN PATENT DOCUMENTS

| KR | 1020030087401 | 1/2004 |
| KR | 1020150016862 | 8/2016 |

OTHER PUBLICATIONS

Hajialian et al., Network Anomaly Detection by Means of Machine Learning: Random Forest Approach with Apache Spark, Informatica Economica vol. 22, No. Apr. 2018, 11 pages, 2018.*

(Continued)

*Primary Examiner* — Frank Duong
(74) *Attorney, Agent, or Firm* — Bacon & Thomas, PLLC

(57) ABSTRACT

A machine learning technology-based fault management system for network equipment that supports SDN OpenFlow protocol that includes an L2 switch or a router, which is network equipment connected to a client; and an Artificial Intelligence (AI)-based Software Defined Network (SDN) controller requested for management commands for each scenario when the L2 switch or the router, which is network equipment connected to the client, encounters a network fault so that a Simple Network Management System (SNMP) agent installed in the L2 switch and the router determines the type of fault occurred on a network and AI is employed to recover from a current fault through learning results from past data. An effect is achieved that not only service quality is improved through real-time fault management using an AI-based automatic response against a network fault but also a fault is precisely overcome by using the AI-based automatic response.

1 Claim, 2 Drawing Sheets

(51) Int. Cl.
*G06N 20/00* (2019.01)
*H04L 41/0213* (2022.01)
*H04L 41/0654* (2022.01)
*H04L 49/25* (2022.01)

(58) Field of Classification Search
CPC ....... G01S 19/20; G01S 20/20; H04B 1/0466; H04B 10/0771; H04B 17/003; H04L 1/00; H04L 41/0213; H04L 41/06; H04L 41/16; H04L 41/0654; H04L 41/0659; H04L 43/00; H04L 43/08; H04L 43/0852; H04L 43/50; H04L 45/08; H04L 49/25; H04L 2012/5686; H04J 3/14; H04J 2203/0058; H04W 24/00; Y10S 320/13
See application file for complete search history.

(56) References Cited

OTHER PUBLICATIONS

Samsung, KSB AI Framework, downloadable at https://www.sosconhistory.net/soscon2018/pdf/day2_1430_1.pdf, 66 pages, Oct. 18, 2018.*
Cherrared et al., A Survey of Fault Management in Network Virtualization Environments: Challenges and Solutions, IEEE, 15 pages, Dec. 2019.*
Yu et al., Fault Management in Software-Defined Networking: A Survey, IEEE, 44 pages, Feb. 22, 2019.*

* cited by examiner

AI MACHINE LEARNING TECHNOLOGY BASED FAULT MANAGEMENT SYSTEM FOR NETWORK EQUPMENT THAT SUPPORTS SDN OPEN FLOW PROTOCOL

TECHNICAL FIELD

The present disclosure relates to a machine learning technology-based fault management system for network equipment that supports SDN OpenFlow protocol and, more particularly, to a fault management system for network equipment supporting the SDN OpenFlow protocol, which utilizes a machine learning technology to automatically enable step-by-step access to fault management based on fault detection in the occurrence of a network fault and learning results from past data on the management of the detected fault.

BACKGROUND

In the current network systems, a network fault is managed in such a way that a specialized staff of a centralized network management center detects the fault by visual or aural inspection and applies a predetermined procedure to recover from the fault.

Depending on the technical experiences and capabilities of the specialized staff, it may take at least a few tens of minutes (typically 30 minutes) up to several hours for fault management.

Meanwhile, it has been pointed out as a limit that when a disagreement occurs among the specialized staff, it takes more time to solve the network problem and, what is worse, if a human error is involved, a fault at some point of the network affects the entire network.

REFERENCES

Patents (Patent 1) The Korea patent application No. 10-2015-0016862, "Smart reminder system and learning reminding method using the same"

(Patent 2) The Korea patent application No. 10-2003-0087401, "Internet based automatic learning system using the learning contents provision server and the learning contents display panel and the learning contents delivery program)

SUMMARY OF THE INVENTION

The present disclosure has been made in an effort to solve the problem above and provides a fault management system for network equipment that supports SDN OpenFlow protocol, which utilizes a machine learning technology to improve service quality through real-time fault management using an AI-based automatic response against a network fault.

Also, the present disclosure has been made in an effort to provide a fault management system for network equipment that supports SDN OpenFlow protocol, which utilizes a machine learning technology to provide an effect of precisely overcoming a fault through an AI-based automatic response.

However, technical objects of the present disclosure are not limited to those described above, and other technical objects not mentioned above may also be clearly understood from the descriptions given below by those skilled in the art to which the present disclosure belongs.

To achieve the object above, a machine learning technology-based fault management system for network equipment that supports SDN OpenFlow protocol according to an embodiment of the present disclosure comprises an L2 switch 20 or a router 30, which is network equipment connected to a client 40; and an Artificial Intelligence (AI)-based Software Defined Network (SDN) controller 100 requested for management commands for each scenario when the L2 switch 20 or the router 30, which is network equipment connected to the client 40, encounters a network fault so that a Simple Network Management System (SNMP) agent installed in the L2 switch 20 and the router 30 determines the type of fault occurred on a network and AI is employed to recover from a current fault through learning results from past data.

At this time, the AI-based SDN controller 100 which has received the request for commands provides scenario-based commands to the router 30 and the L2 switch 20, which are network equipment formed at the client-side 40 that has caused a problem, through a control path compliant with the OpenFlow protocol according to the analysis of a Knowledge-converged Super Brain (KSB) artificial intelligence framework core 200.

A machine learning technology-based fault management system for network equipment that supports SDN OpenFlow protocol according to an embodiment of the present disclosure provides an effect of improving service quality through real-time fault management using an AI-based automatic response against a network fault.

Moreover, a machine learning technology-based fault management system for network equipment that supports SDN OpenFlow protocol according to another embodiment of the present disclosure provides an effect of precisely overcoming a fault through an AI-based automatic response.

DETAILED DESCRIPTION

In what follows, preferred embodiments of the present disclosure will be described in detail with reference to appended drawings. In describing the present disclosure, if it is determined that a detailed description of known functions or configurations incorporated herein unnecessarily obscure the gist of the present disclosure, the detailed description thereof will be omitted.

In the present disclosure, when one particular constituting element 'transmits' data or signals to a different constituting element, it should be understood that the particular constituting element may transmit the data or the signals directly to the different constituting element or may transmit the data or the signal to the different constituting element via at least one another constituting element.

Figure 1:
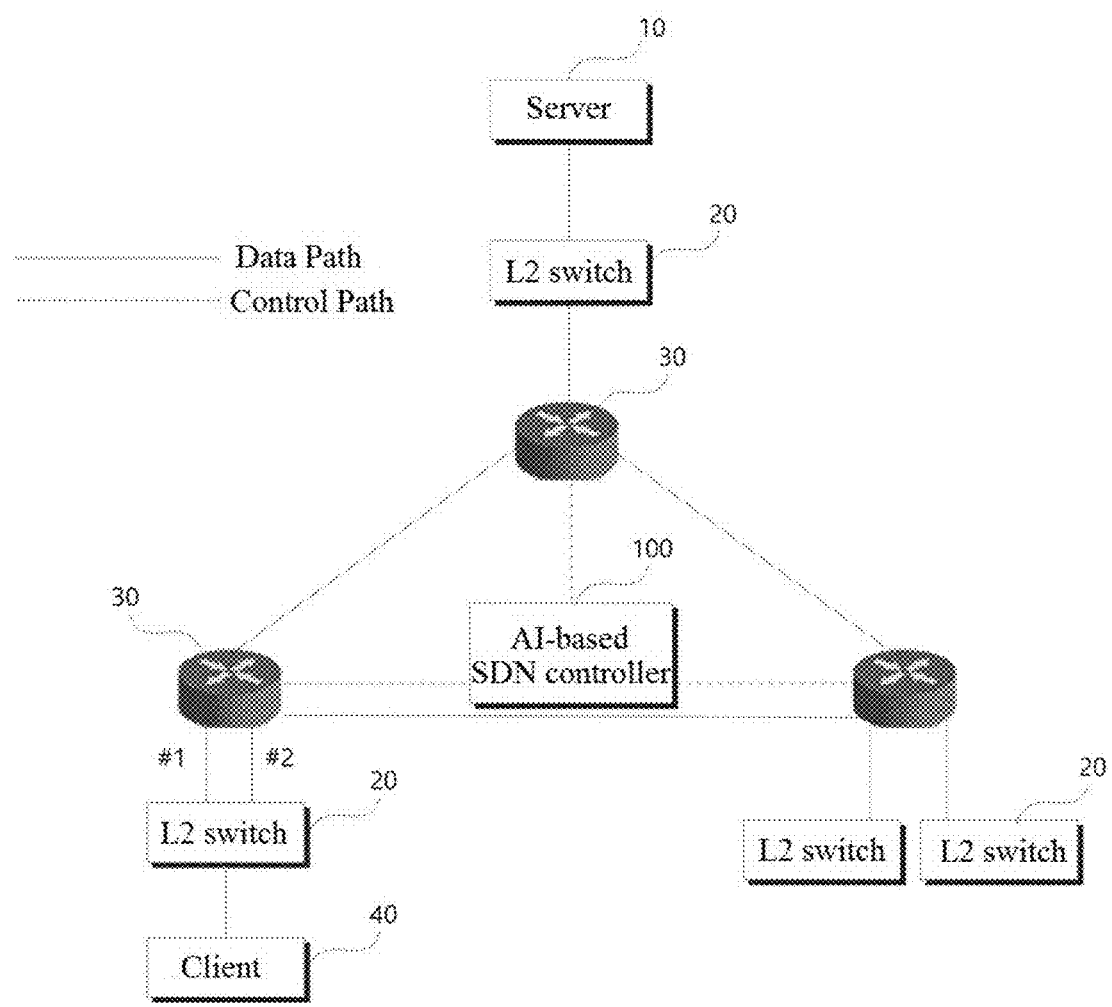
FIG. 1 illustrates a machine learning technology-based fault management system for network equipment that supports SDN OpenFlow protocol according to an embodiment of the present disclosure.
Figure 2:
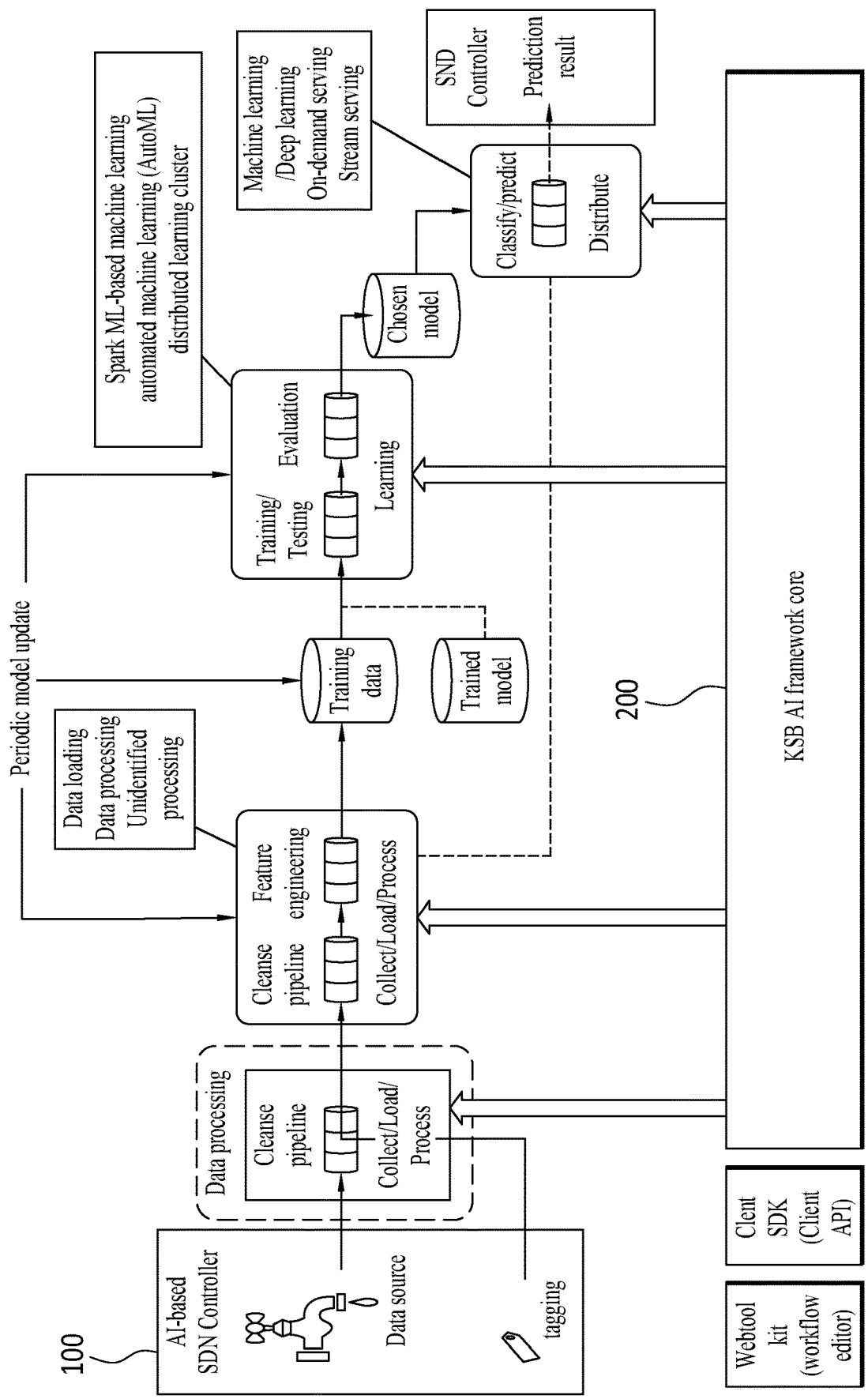
FIG. 2 illustrates an operating process of a machine learning technology-based fault management system for network equipment that supports SDN OpenFlow protocol according to an embodiment of the present disclosure.

FIG. 1 illustrates a machine learning technology-based fault management system 1 for network equipment that supports SDN OpenFlow protocol according to an embodiment of the present disclosure. FIG. 2 illustrates an operating process of a machine learning technology-based fault management system 1 for network equipment that supports SDN OpenFlow protocol according to an embodiment of the present disclosure.

First, referring to FIG. 1, a machine learning technology-based fault management system 1 for network equipment that supports SDN OpenFlow protocol may comprise a server 10, an L2 switch 20, a router 30, a client 40, an AI-based Software Defined Network (SDN) controller 100, and a Knowledge-converged Super Brain (KSB) artificial intelligence framework core 200 shown in FIG. 2.

The server 10, which corresponds to a host, and the client 40 are connected to the L2 switch 20, respectively. The server 10 and the client 40 may generate a packet to be transmitted to another client or server through the network.

The server 10 and the client 40 may transmit a generated packet to a target server and client via the L2 switch 20 and the router 30 through a network interface.

Here, the L2 switch 20 refers to a switch, which is network equipment that enables communication in a network through identification of devices by using MAC addresses, and may be connected to the server 10 and the client 40 as described above. Meanwhile, from the perspective of the present disclosure, it may be assumed that the L2 switch 20 supports the OpenFlow protocol.

Meanwhile, the router 30 is network equipment used in a network and may be connected to the L2 switch 20.

Since the server 10, the L2 switch 20, the router 30, and the client 40 described above are network devices commonly used and well-known to the public, detailed descriptions thereof will be omitted.

The AI-based SDN controller 100, which performs the function of managing the router 30, may manage and control one or more routers 30 in a centralized manner.

More specifically, the AI-based SDN controller 100 may be implemented such that it is equipped with software capable of performing functions such as topology management, path management related to packet processing, link discovery, and packet flow management.

Meanwhile, each time the L2 switch 20 is turned on or off, the AI-based SDN controller 100 may record information about the specifications, status, and ports of the switch into a storage device and may record information about status change of the ports or links into the storage device. Also, the AI-based SDN controller 100 may retrieve L2 switch information and link information from the storage device to determine a routing path for the control of the router 30 and may record the corresponding path information into the storage device after determining the routing path.

At the occurrence of a network fault in the L2 switch 20 or the router 30, which is network equipment connected to the client through the configuration above, to determine the type of the fault, a management command request for each scenario may be provided to the AI-based SDN controller 100 so that AI is employed to recover from the current network fault through learning results from past data.

After receiving the command request, the AI-based SDN controller 100 may provide commands based on a scenario analyzed by the KSB AI framework core 200 to the router 30 and the L2 switch 20, the network equipment installed in the client side 40 which has caused the corresponding fault, via a control path according to the OpenFlow protocol.

The scenario-based commands provided by the AI-based SDN controller 100 may include 1) securing an emergency routing path, 2) securing an alternative path, 3) port separation and reset, which is the lowest priority recovery scenario, and 4) rebooting of the entire system.

To describe the scenario-based commands in more detail, the error rate of a first communication line (#1) of the two communication lines connected to the L2 switch 20 and the router 30 installed in the client side 40 of FIG. 1 may be increased, and the AI-based SDN controller 100 may receive, from the KSB AI framework core 200, scenario information that a one-month deadline is currently approaching and inconvenience and a loss is expected on the client at the time of traffic congestion and delay on the basis of past data. Accordingly, the AI algorithm provided by the KSB AI framework core 200 may command the L2 switch 20 to switch from the first communication line (#1) to the second communication line (#2). As a result, the L2 switch 20 may disconnect the link to the first communication line (#1) and form a link service with the second communication line (#2).

To describe commands based on another scenario, the error rate of a first communication line (#1) of the two communication lines connected to the L2 switch 20 and the router 30 installed in the client side 40 of FIG. 1 may be increased, and the AI-based SDN controller 100 may receive, from the KSB AI framework core 200, scenario information that it is currently a holiday with little traffic on the basis of past data. Accordingly, the AI algorithm provided by the KSB AI framework core 200 may command the L2 switch 20 to reset the first port corresponding to the first communication line (#1). And the AI algorithm provided by the KSB AI framework core 200 may proceed to service when the first port is restored to normal. On the other hand, the AI algorithm provided by the KSB AI framework core 200 may command the L2 switch 20 to switch from the first communication line (#1) to the second communication line (#2) when the first communication line (#1) corresponding to the first port fails to return to normal. As a result, the L2 switch 20 may disconnect the link to the first communication line (#1) and form a link service with the second communication line (#2).

As described in the scenarios above, the AI-based SDN controller 100 receives help from the KSB AI framework core 200 that may be implemented as a separate module or implemented in the server 10.

In other words, the KSB AI framework core 200 may perform data loading, data processing, and unidentified processing on the source data as shown in FIG. 2. Afterwards, the KSB AI framework core 200 may perform an AI model selection process according to at least one or more learning processes of Spark ML-based machine learning, automated machine learning (AutoML), and distributed learning cluster by using training data and a training model for each classified data of the source data.

Afterwards, the KSB AI framework core 200 may improve specifics of the scenario by performing a fault prediction process according to one of machine learning/deep learning, on-demand serving, and streaming serving using an AI model selected for each source data; and then generating a network response scenario and providing the generated response scenario to the AI-based SDN controller 100.

Here, unidentified processing may be performed separately on the tagging information generated according to tagging of the source data by the AI-based SDN controller 100, where the source data may be classified into main source data, file system meta data, and log data according to the tagging. Based on the classification, the KSB AI framework core 200 may also diagnose a scenario for each tagging information used to classify the source data into main source data, other meta data, and log data by processing the classified data separately according to the tagging information.

Also, unidentified processing according to another embodiment of the present disclosure may be one type of a network fault occurred at the time of data loading and processing.

Accordingly, when a fault is reported with time information, the KSB AI framework core 200 generates a response scenario against the fault by using a network mode trained using a machine learning-based linear regression model from the past data about the client 40 and provide the generated scenario to the AI-based SND controller 100.

Here, with respect to the machine learning-based linear regression model, the KSB AI framework core 200 may analyze collected data stored in a distributed manner according to the fault type by using a machine learning algorithm and provides a status management scenario command.

More specifically, the machine learning algorithm used by KSB AI framework core 200 may be one of the Decision Tree (DT) classification algorithm, the random forest classification algorithm, and the Support Vector Machine (SVM) classification algorithm.

The KSB AI framework core 200 may analyze the collected data stored in the DCS DB in a distributed manner by a distributed file program, extract a plurality of pieces of feature information from the analysis result, learn the extracted feature information by using at least one or more of a plurality of machine learning algorithms, and determine abnormality from the learning result.

In other words, the KSB AI framework core 200 may apply an ensemble structure composed of a plurality of complementary machine learning algorithms to improve accuracy of the status determination result.

The decision tree classification algorithm is used for machine learning employing a tree structure to derive a decision result, which is convenient for analyzing and interpreting a decision result, exhibits a fast data processing speed, and is capable of deriving a decision rule based on a search tree. To improve the low classification accuracy of the decision tree (DT) algorithm, random forest (RF) algorithm may be applied. The random forest classification algorithm derives a result through ensemble learning by constructing a plurality of DTs, where the derived result may be harder to understand than the result from the DT algorithm but may exhibit higher accuracy than that from the DT algorithm. As an improvement to overfitting often observed in the DT or RF-based learning, Support Vector Machine (SVM) may be applied. The SVM classification algorithm is a method that classifies data belonging to different classes with a hyperplane, which usually provides a classification result with high accuracy and shows low sensitivity to overfitting.

The KSB AI framework core 200 of the machine learning technology-based fault management system 1 for network equipment supporting the SDN OpenFlow protocol according to the present disclosure may construct a controller system by employing the Software Defined Network (SDN) system implementation technology and the OpenFlow protocol implementation technology; and control the network equipment supporting the OpenFlow protocol.

Here, the KSB AI framework core 200 may utilize the standard SNMP Management Information Base (MIB) to obtain status information and may obtain information about a network fault event through SNMP agents installed in the L2 switch 20 and the router 30, which correspond to network equipment.

Afterwards, the KSB AI framework core 200 may construct a database by using data with temporal semantics as well as past data on a big data platform.

And the KSB AI framework core 200 trains the AI algorithm by labeling the data stored in the database.

Afterwards, by evaluating a trained model by inputting real data to the trained model and applying the evaluated system, the KSB AI framework core 200 may predict future prospects from the past progress and develop a management plan based on the predicted prospects not only for the network but also for other industry fields (road traffic) where performance is deeply related to temporal changes.

The present disclosure may be implemented in the form of computer-readable code in a computer-readable recording medium. The computer-readable recording medium includes all kinds of recording apparatus which store data that may be read by a computer system.

Examples of a computer-readable recording medium include a ROM, a RAM, a CD-ROM, a magnetic tape, a floppy disk, and an optical data storage device, which may further include an example implemented in the form of carrier waves (for example, transfer through the Internet).

Also, the computer-readable recording medium may be distributed over computer systems connected to each other through a network so that computer-readable code may be stored and executed in a distributed manner. And functional programs, code, and segments to implement the present disclosure may be easily inferred by the programmers belonging to the technical field to which the present disclosure belongs.

So far, preferred embodiments of the present disclosure have been described with reference to appended drawings; although some specific terms have been used, they are used therein in a general sense simply to explain the technical details of the present disclosure in a tractable manner and to help understanding of the present disclosure and are not intended to limit the technical scope of the present disclosure. It should be clearly understood by those skilled in the art to which the present disclosure belongs that other modifications based on the technical principles of the present disclosure may still be implemented in addition to the embodiments of the present disclosure.

DETAILED DESCRIPTION OF MAIN ELEMENTS

1: An AI machine learning technology-based fault management system for network equipment that supports the SDN OpenFlow protocol
10: Server
20: L2 switch
30: Router
40: Client
100: AI-based SDN controller
200: KSB AI framework core

What is claimed is:

1. A machine learning technology-based fault management system for network equipment that supports a Software Defined Network (SDN) OpenFlow protocol, the system comprising:
a server, an Layer 2 (L2) switch, a router,
a client, an Artificial Intelligence (AI)-based SDN controller and a Knowledge-converged Super Brain (KSB) AI framework core, wherein
the server, which corresponds to a host, and the client are connected to the L2 switch, respectively, and the server and the client generate a packet to be transmitted to another client or server through the network and transmit a generated packet to a target server and client via the L2 switch and the router through a network interface, the L2 switch is network equipment that enables communication in the network through identification of devices by using Media Access Control (MAC) addresses, and is connected to the server and the client, the router is network equipment used in the network and is connected to the L2 switch, the AI-based SDN controller, which performs a function of managing the router, may manage and control one or more routers in a centralized manner, and is implemented such that it is equipped with software capable of performing functions selected from a group consisting of topology management, path management related to packet processing, link discovery, and packet flow management, each time the L2 switch is turned on or off, the AI-based SDN controller may record information about the specifications, status, and ports of the switch into a storage device and may record information about status change of the ports or links into the storage device, retrieve L2 switch information and link information from the storage device to determine a routing path for the control of the router and record a corresponding path information into the storage device after determining the routing path, to determine the type of the fault on the network when a network fault occurs in the L2 switch or the router, which is network equipment connected to the client, the AI-based SDN controller utilizes the standard Simple Network Management System (SNMP) Management Information Base (MIB), and receives the request for management commands for each scenario for recovering a current fault through learning results from past data from an SNMP agent installed in the L2 switch and the router, on receiving the command request, the AI-based SDN controller provides commands based on a scenario analyzed by the KSB AI framework core which can be formed in a separate module from the AI-based SDN controller or can be formed in the server to the router and the L2 switch, the network equipment installed in the client side which has caused a corresponding fault, via a control path according to the OpenFlow protocol, a scenario-based command provided by the AI-based SDN controller may include securing an emergency routing path, securing an alternative path, port separation and reset, which is the lowest priority recovery scenario, and rebooting of the entire system, the AI-based SDN controller receives a scenario information that the error rate of a first communication line of the two communication lines connected to the L2 switch and the router installed in the client is increased, and a scenario information that a one-month deadline is currently approaching and inconvenience and a loss is expected on the client at the time of a traffic congestion and delay on the basis of past data from the KSB AI framework core, an AI algorithm provided by the KSB AI framework core commands the L2 switch to switch from the first communication line to a second communication line, so that the L2 switch disconnects the link to the first communication line and forms a link service with the second communication line, the AI-based SDN controller receives, from the KSB AI framework core, scenario information that the error rate of the first communication line of the two communication lines connected to the L2 switch and the router installed in the client is increased and it is currently a holiday with little traffic on the basis of past data, and thus the AI algorithm provided by the KSB AI framework core commands the L2 switch to reset a first port corresponding to the first communication line, and proceeds to service when the first port is restored to normal, commands the L2 switch to switch from the first communication line to the second communication line when the first port corresponding to the first port fails to return to normal, so that the L2 switch disconnects the link to the first communication line and forms a link service with the second communication line, the KSB AI framework core improves specifics of the scenario by generating a network response scenario on the client and providing the generated response scenario to the AI-based SDN controller, and performs data loading, data processing, and unidentified processing on a source data, the unidentified processing is performed separately on a tagging information generated according to tagging of the source data by the AI-based SDN controller, and the source data is classified into main source data, file system meta data, and log data according to the tagging, so the KSB AI framework core diagnoses a scenario for each tagging information used to classify the source data into main source data, other meta data, and log data by processing the classified data separately according to the tagging information, the KSB AI framework core constructs a controller system by employing a SDN system implementation technology and the OpenFlow protocol implementation technology, controls the network equipment supporting the OpenFlow protocol, utilizes the standard SNMP Management Information Base (MIB) to obtain status information, obtains information about a network fault event through SNMP agents installed in the L2 switch and the router, which correspond to network equipment, constructs a database by using data with temporal semantics as well as past data on a big data platform, generates a trained model by labeling the data stored in the database, evaluates the trained model by inputting real data to the trained model, and applies this evaluated system, so that the KSB AI framework core predicts future prospects from the past progress and develops a management plan based on the predicted prospects not only for the network but also for fields where performance is deeply related to temporal changes.

* * * * *